No. 751,879. PATENTED FEB. 9, 1904.
F. W. STANLEY.
SEED PLANTER.
APPLICATION FILED JULY 15, 1903.
NO MODEL.
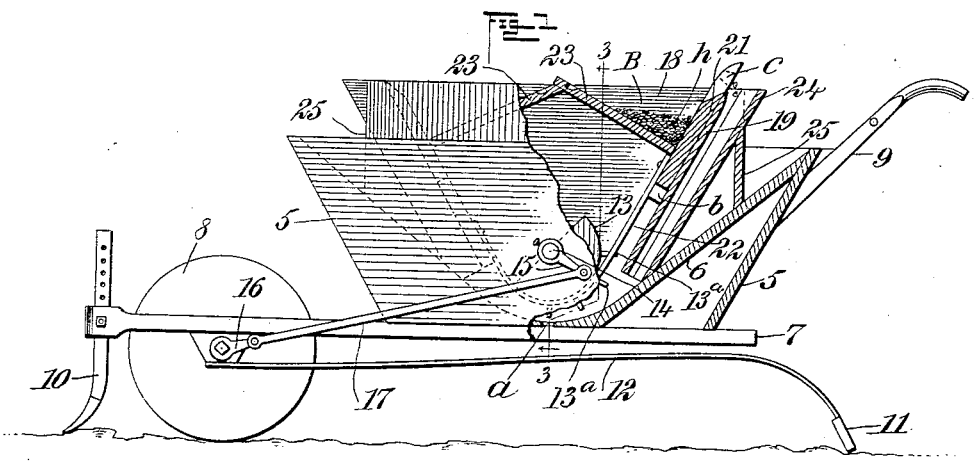
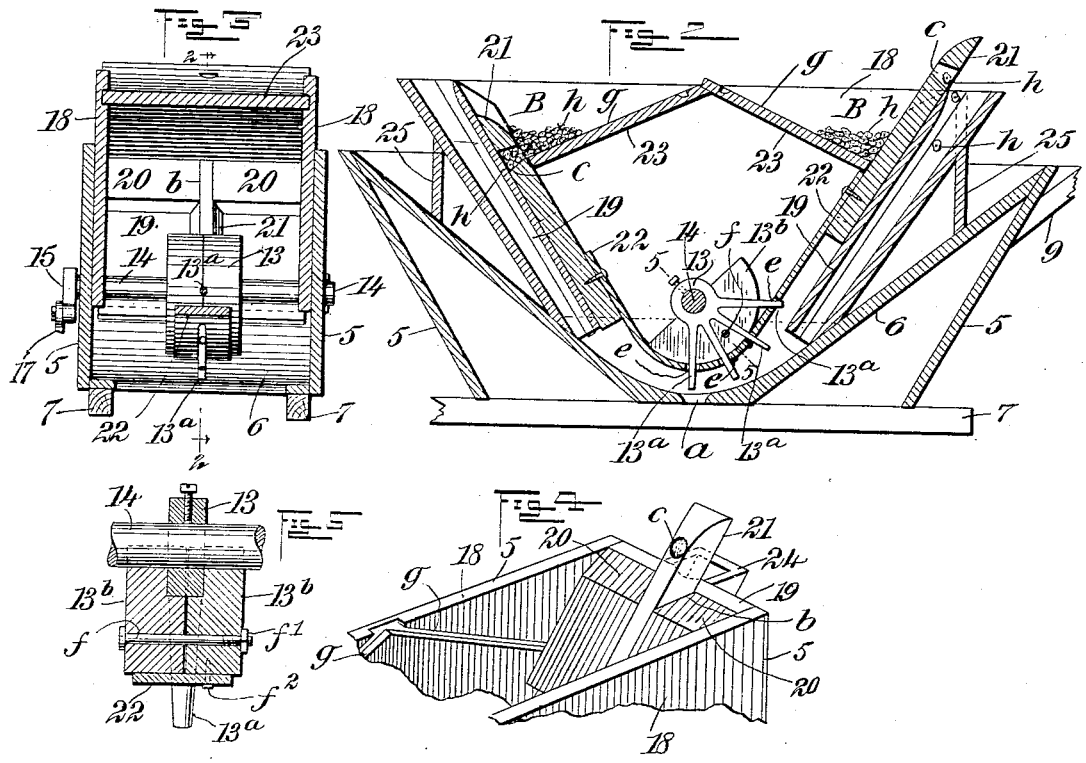
WITNESSES:
INVENTOR
Frederick W. Stanley
BY
ATTORNEYS No. 751,879. Patented February 9, 1904.

UNITED STATES PATENT OFFICE.

FREDERICK W. STANLEY, OF McCOMB, MISSISSIPPI.

SEED-PLANTER.

SPECIFICATION forming part of Letters Patent No. 751,879, dated February 9, 1904.

Application filed July 15, 1903. Serial No. 165,645. (No model.)

*To all whom it may concern:*

Be it known that I, FREDERICK W. STANLEY, a citizen of the United States, and a resident of McComb, in the county of Pike and State of Mississippi, have invented a new and Improved Seed-Planter, of which the following is a full, clear, and exact description.

This invention has for its object to provide novel details of construction for a seed-planting device which afford means for dropping a desired number of seeds properly spaced apart in hills and expose the seed selected for each hill at the instant it is being dropped, thus enabling the operator to see that a proper number of seeds is planted in each hill as the work progresses.

A further object is to adapt the novel features of construction to operate as a corn-planter when mounted upon a cotton-seed planter of special construction, whereby the improvement may be employed as an attachment for the planter and considerably reduce the cost of the planter.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side view of the improvement mounted upon a cotton-seed-planting machine. Fig. 2 is an enlarged sectional side view of the improved corn-planter device, taken substantially on the line 2 2 in Fig. 3. Fig. 3 is a transverse sectional view substantially on the line 3 3 in Fig. 1. Fig. 4 is a perspective view of a novel seed receiver and elevator that is a detail of the invention; and Fig. 5 is a partly-sectional detail view taken substantially on the line 5 5 in Fig. 2, showing the clamped connection of a rockable block on the cotton-seed-agitator device for transmitting motion therefrom to the corn-dropping mechanism.

In the drawings that illustrate the construction and operation of the improvement as applied upon a cotton-seed planter of special construction, 5 indicates the box-body of the cotton-seed planter; 6, a seed-hopper wall located in the body 5; 7, a supporting-frame whereon the box-body is mounted and secured; 8, a traction-wheel rotatably supported upon the forward portion of the frame 7 similarly to that of a wheelbarrow-wheel, and 9 a pair of handles projected rearward and upward from the rear end of the body 5 for guidance of the entire machine that is to be drawn by a horse or other animal.

Further details of the cotton-seed planter that are equally serviceable as adjuncts of the improved seed-dropping attachment consist of a vertically-adjustable curved trenching plow-blade 10, mounted upon the forward end of the frame 7, and the seed-covering device, that embodies a transverse scraper-blade 11, carried at the rear of the frame 7 by a pair of arms 12, affixed by their front ends upon the forward portion of the frame and thence extending rearward, their rear portions being downwardly curved to adapt the scraper-blade to have a proper contact with the soil, so as to close the trench opened by the trenching plow-blade 10 after seed is dropped in the trench.

The cotton-seed planter of the present construction is further provided with a seed-agitator comprising a hub 13, having spaced radial arms $13^a$ and mounted and removably secured upon a shaft 14, extending transversely through the side walls of the body 5, wherein said shaft is journaled, said shaft projecting at one end exteriorly of said side walls for the reception of a crank-arm 15, that is secured thereon.

Upon an outwardly-extended end of the journal-shaft of the traction-wheel 8 a crank-arm 16 is mounted and secured, having less length than that of the crank-arm 15, and a pitman-rod 17 is loosely connected at its ends with the outer ends of the crank-arms, the relative length of the latter being such that the progressive movement of the seed-planter which will rotate the traction-wheel 8 and crank-arm 16 will rock the arms $13^a$ correspondingly in the bottom of the hopper 6.

The free ends of the radiating arms $13^a$ project directly above a small orifice $a$, formed in the bottom of the hopper 6, so that cotton-seed placed in the hopper 6 will be stirred by the rocking movement of the arms $13^a$, and thus be caused to periodically drop through the orifice $a$ into the trench opened by the trenching-blade 10, the planting operation being completed by the scraper-blade 11.

The seed-dropping device for planting cotton-seed will not drop a selected number of seed in groups at proper intervals in a row, as is necessary in the planting of corn to be grown in hills; and it is a primary object of this improvement to provide simple practical mechanism which may be quickly mounted upon the cotton-seed planter, and thus adapt the running-gear of the cotton-planting means for actuating the same and the supports for said mechanism to serve as coöperating adjuncts of the improved corn-planter device when the latter is placed in position for service, said corn-planting apparatus consisting of the following details:

Two side boards 18, forming the supplemental or removable hopper, are held spaced apart and parallel with each other by two end boards 25 and also by two similar chute-boards 19, having parallel edges. The chute-boards are of such width as will when they are secured between the side boards space the latter apart a proper distance to adapt them to fit loosely between the side walls of the box-body 5, which walls also form the sides of the hopper 6. The chute-boards 19 are similarly inclined upward and outward, their lower ends being equally spaced from the orifice $a$ in the wall of the hopper 6.

Two spaced guide-boards 20 are affixed upon the inner surface of each chute-board 19, the adjacent side edges of each pair of guide-boards being undercut, thus providing a dovetail channel $b$ between each pair of guide-boards, and as the latter are of equal width the channels $b$ are positioned at the transverse centers of the chute-boards.

Two similar hub-pieces $13^b$, preferably formed of wood and each having a curved periphery, are radially channeled in one side to receive half portions of the arms $13^a$, which pieces when in position together form a segmental rocker-block, and to detachably secure them on the arms $13^a$ said hub-pieces $13^b$ are transversely and oppositely perforated for the reception of a clamping-bolt $f$. The bolt $f$ extends at its threaded end through a respective hub-piece $13^b$, and on the projecting end of the bolt a nut $f'$ is screwed, which by proper adjustment serves to removably clamp the two-part rocker-block upon the arms $13^a$ of the cotton-seed-stirring device.

In the channels $b$, between the guide-boards 20, two similar slide-blocks 21 are respectively held to reciprocate, these slide-blocks each having a seed-pocket $c$ formed therein near the upper end, said pockets each consisting of a suitably-shaped orifice that inclines on the lower side from the inner edge outwardly, as is clearly shown in Fig. 2.

The lower portions of the slide-blocks 21 are removably connected by screws or the like to the ends of a flexible band 22, that has formed therein spaced perforations $e$, wherein the free end portions of the arms $13^a$ may be inserted, so as to permit the intermediate portion of the band to have contact with the cylindrical periphery of the two-part rocker $13^b$, and it will be seen that when said block is rocked a suitable degree the band will be correspondingly moved endwise alternately in opposite directions, which will slide the blocks 21 up and down, depressing one block when the other one is elevated, and preferably the middle portion of the band 22 is secured upon the two-part rocker-block by a screw or nail, as shown at $f^2$ in Fig. 5.

In suitable grooves $g$, formed in the side walls of the box-body 5, two feed-boards 23 are held, these feed-boards meshing at their upper edges and inclining oppositely and downwardly toward the guide-boards 20, whereon the lower transverse edges of the feed-boards have contact. It will be seen that by the provision of the two removable feed-boards 23 and by reason of their inclination two similar seed-holding hoppers B are provided, of which the slide-blocks 21 form portions of their walls.

Upon the outer side of each chute-board 19 a conductor-trough 24 is secured, at the transverse center thereof, said troughs being so relatively positioned as to adapt each to receive seed, that may be grains of corn $h$ from the pockets $c$, and convey the seed down into the bottom of the hopper-wall 6, so that the seed may periodically pass out of the orifice $a$.

To adapt the seed-dropping apparatus last described to be readily placed in the hopper 6 and receive support therefrom, two upright end boards 25 of the rectangular wall forming the casing of the corn-planting mechanism, together with the lower ends of the conductor-troughs, rest upon the hopper-wall 6 when the corn-dropping device is introduced for service into said hopper.

For effective operation the flexible connection or band 22 should be sufficiently rigid to adapt it to push and pull the slide-blocks 21 in their channels and may be formed of heavy leather or a strip of resilient sheet metal. The length of the band 22 and slide-blocks 21 is so proportioned that the upper ends of the latter when the two-part rocker-block $13^b$ is rocked by reciprocal movement of the pitman 17 will be alternately projected above the conductor-troughs 24, so that the seed-pockets $c$ will be exposed to sight when the slide-blocks are fully elevated.

When the cotton-seed planter is to be converted into a hill-dropping corn-planter, the band 22 is loosened at one end from the slide-block 21, upon which it was secured, and the corn-planting device is seated in the cotton-planter hopper 6, as represented in Fig. 2. The two-part block 13ᵇ is clamped upon the arms 13ᵃ, and the lower ends of the arms 13ᵃ are passed through the spaced perforations e in the band, after which the detached end of the band is replaced and secured upon the lower portion of the slide-block from which it was removed. Seed-corn in the grain is placed in the hoppers B, which will put the corn-dropping apparatus in condition for use.

If the entire machine is drawn over soil that has been prepared for the planting of seed, preferably in a straight line, the trenching plow-blade 10 will form a small furrow as the machine progresses. The travel of the traction-wheel 8 will give rocking motion to the block 13ᵇ, that will reciprocate the band 22, which will correspondingly actuate the slide-blocks 21, that are alternately depressed so as to dispose the seed-pockets c therein one after the other at the bottom of a respective hopper B, so that a suitable number of corn-grains h may enter a depressed pocket.

The rocking movement of the two-part block 13ᵇ will obviously move the depressed slide-block 21 upward a maximum degree, which will dispose the pocket c above the upper end of the adjacent conductor-trough 24. The flaring shape of the pockets c and the outward inclination of the slide-blocks 21 cause each pocket when it is fully elevated to discharge the grains of corn it contains, these corn-grains passing into the upper end of the contiguous conductor-trough 24, down which the corn slides and passes out of the discharge-orifice a into the furrow, the arms 13ᵃ aiding this operation.

As the slide-blocks 21 are raised successively for the discharge of a certain number of corn-grains down a respective conductor-trough 24 and thence out of the orifice a it will be seen that the corn-seeds, taken alternately from the hoppers B in proper number for planting a hill of corn, will be deposited in the furrow at spaced intervals, which will be uniform in degree of seperation, and it will also be evident that as the machine traverses the ground and deposits seed at regular intervals the scraper-blade 11 will cover the corn that has been dropped, and thus complete the planting operation.

It is manifest that by a slight change in the size of the pockets c the machine may be readily employed for planting various kinds of seed that differ in size and also that the machine may be adapted for planting in hills having more or less separation, if this is desired, as it will readily be understood that if seed-corn is placed in but one hopper B the hills of corn will be spaced a greater distance than if both hoppers are used to supply seed to the corn-planting device.

While the improved planting apparatus has been described as an attachment for a cotton-seed planter of a special construction, it is to be understood that the improved corn or other seed planter may be built as a complete machine, and thus afford a seed-planter having a wide range of planting capacity.

Having thus described my invention, I claim as new and desire to secure by Letters Patent—

1. The combination with a frame, a traction-wheel thereon, and a main hopper having a discharge-orifice for seed, of a device in the hopper for discharging seed, that periodically takes a few seeds from a supplemental hopper above the main hopper, and conveys said seeds toward the orifice in the hopper for their discharge.

2. The combination with a frame, a traction-wheel thereon, and a main hopper having a discharge-orifice for seed, of a seed-hopper placed in the main hopper, having two independent supplemental hoppers, and means connected with the traction-wheel for causing seed from one or both of said supplemental hoppers to pass periodically out of said discharge-orifice.

3. The combination with a frame, a main hopper thereon having a seed-discharge orifice in its bottom, a traction-wheel on the frame, a stirring device carried by the hopper, and means for transmitting rocking movement from the traction-wheel to the stirring device, of a feeding device for depositing a plurality of seed in hills, placed in the hopper, and comprising two independent hoppers, a block having a seed-holding pocket and held to slide in a wall of a respective hopper, and means for connecting said slidable blocks with the stirring device which adapts the slide-blocks to slide upward from the lower part of an adjacent hopper and discharge the seed received therefrom.

4. A seed-planting device, comprising a main hopper having a seed-discharging orifice, stirring-arms held to rock in the lower portion of the main hopper, two independent hoppers held in the upper portion of the main hopper, a slide-block reciprocal in a wall of each upper hopper and having a seed receiving and discharging pocket in its upper portion, and means connecting the lower portions of the slide-blocks with the stirring-arms, said means comprising a flexible band which directly engages a two-part block clamped on the stirring-arms, and adapted to alternately slide the slide-blocks, so as to dispose the seed-pockets alternately at the bottoms of the hoppers and elevate them therefrom, in unison with the rocking movement of the two-part block.

5. A seed-planting device, comprising a supported, main hopper having a discharge-orifice in its bottom, independent hoppers in the upper portion of the main hopper, elongated blocks held to slide in the walls of the upper hoppers, each slide-block having an openended seed-pocket at its upper end, a seed-conducting trough leading from the upper end of each independent hopper down into the main hopper near the orifice therein, and means for alternately reciprocating the slide-blocks for successive elevation and depression of the pockets therein.

In testimony whereof I have signed my name to this specification in the presence of two subscribing witnesses.

FREDERICK W. STANLEY.

Witnesses:
 LOUIS MARSALIS,
 J. B. ALFORD.